United States Patent

Hasegawa et al.

[11] Patent Number: 5,804,230
[45] Date of Patent: Sep. 8, 1998

[54] INJECTION MOLDING MACHINE

[75] Inventors: Tadashi Hasegawa, Nagoya; Yoshimitsu Tabata; Shigemi Kushida, both of Tokai; Shinichi Nakamura, Handa, all of Japan

[73] Assignee: Aronkasei Co., Ltd., Osaka, Japan

[21] Appl. No.: 784,249

[22] Filed: Jan. 15, 1997

Related U.S. Application Data

[62] Division of Ser. No. 530,030, Sep. 19, 1995.

[51] Int. Cl.⁶ .................................................... B29C 45/54
[52] U.S. Cl. .................... 425/557; 264/328.19; 425/558; 425/562
[58] Field of Search .................................. 425/557, 558, 425/559, 560, 561, 562, 582, 583, 585, 586, 587; 264/328.1, 328.17, 328.18, 328.19, 349

[56] References Cited

U.S. PATENT DOCUMENTS 4,557,683 12/1985 Meeker et al. ........................... 425/569
5,246,660 9/1993 Tsutsumi ................................... 425/562

FOREIGN PATENT DOCUMENTS 3214822 11/1983 Germany ................................. 425/561

*Primary Examiner*—Tim Heitbrink
*Attorney, Agent, or Firm*—Donald S. Dowden

[57] ABSTRACT

An injection molding machine for thermoplastic resin consisting of an accumulator in which a plunger is slidably provided and an injection mold, the sprue of which connects with the nozzle of said accumulator, wherein said plunger consists of a cylinder and a screw rotatably arranged in said cylinder, the tip of said screw protrudes from the front end of said cylinder and the maximum diameter of said tip is larger than the diameter of said screw, and the ratio of the effective volume of said plunger to the effective volume of said accumulator is in the range between 1:4 to 1:10 is provided in the present invention. By using said injection molding machine a large size product can be molded at a low injection pressure.

3 Claims, 4 Drawing Sheets

2

INJECTION MOLDING MACHINE

This is a continuation-in-part of application Ser. No. 08/530,030, filed Sep. 19, 1995.

BACKGROUND OF THE INVENTION

1. Field of the Invention

The present invention relates to an injection molding machine by which a large size product can be molded at a low injection pressure. More particularly, the present invention relates to an injection molding machine for thermoplastic resin consisting of an accumulator in which a plunger is slidably provided and an injection mold, the sprew of which connects with the nozzle of said accumulator, wherein said plunger consists of a cylinder and a screw rotatably arranged in said cylinder, the tip of said screw protrudes from the front end of said cylinder and the maximum diameter of said tip is larger than the diameter of said screw, and the ratio of the effective volume of said plunger to the effective volume of sand accumulator is in the range between 1:4 to 1:10.

In the case where the inside diameter of the nozzle of said accumulator and the inside diameter of the sprue of said injection mold are respectively fixed in the range between 10 to 100 mm, it is possible to apply a low injection pressure in the range between 50 to 750 kg/cm$^2$. A polyolefin resin and/or a polyvinylchloride resin is (are) advantageously used as a mold material in the present invention.

2. Description of the Prior Art

Hitherto, an injection molding machine consisting of an extruder and an injection mold with which said extruder connects has been used to manufacture a thermoplastic resin product. In the case where a large size thermoplastic resin product is injection-molded, it is necessary to inject a big amount of a molten thermoplastic resin material into said injection mold from said extruder. To inject such a big amount of a molten thermoplastic resin material into said injection mold, a large size extruder and a high injection pressure are necessary and accordingly, said injection mold should have a high mechanical strength. As a result, said injection molding machine becomes very expensive.

Recently, an injection molding machine provided with an accumulator in which a plunger is slidably arranged has been provided. In said injection molding machine a molten thermoplastic resin material extruded from the extruder is once accumulated in said accumulator and then said molten thermoplastic resin material is injected into the injection mold by pushing forward said plunger in said accumulator. Said injection molding machine has an advantage that the injection amount of said molten thermoplastic resin material does not depend on the effective volume of said extruder but the effective amount of said accumulator so that a large size extruder is not necessary and as a result, an inexpensive injection.molding machine for manufacture of a large size product can be provided.

Nevertheless, said injection molding machine still has a problem as described below. In a case where a large size product having a large thickness is molded, the effective volume of said accumulator should be fixed fairly larger than the effective volume of said extruder and in this case, the injection time of said molten thermoplastic resin material from said extruder into said accumulator becomes long and it is feared that the temperature of said molten thermoplastic resin material in said accumulator becomes not uniform resulting in partial degeneration of said thermoplastic resin material and uneveness of fluidity of said molten thermoplastic resin material injected into said injection mold. To solve this problem, a correspondingly large size extruder is necessary and such a large size extruder may be rather expensive.

The other problem in said injection machine is that in a case where an inorganic filler is mixed with said thermoplastic resin, to improve the rigidity and the heat resistance of the product said thermoplastic resin has a remarkably high melt viscosity so that a remarkably high injection pressure and a long injection time are necessary to inject said molten thermoplastic resin into said injection mold from said accumulator and as a result, in this case said injection molding machine becomes still larger size and must have still higher mechanical strength.

SUMMARY OF THE INVENTION

Accordingly, an object of the present invention is to mold smoothly a large size thermoplastic resin product by injection molding.

Another object of the present invention is to provide an economical injection molding machine to mold a large size thermoplastic resin product.

Further object of the present invention is to mold smoothly a large size thermoplastic resin product in which inorganic filler is mixed.

According to the present invention, there is an injection molding machine provided for thermoplastic resin consisting of an accumulator in which a plunger is slidably provided and an injection mold, the sprue of which connects with the nozzle of said accumulator, wherein said plunger consists of a cylinder and a screw rotatably arranged in said cylinder, the tip of said screw protrudes from the front end of said cylinder and the maximum diameter of said tip is larger than the diameter of said screw, and the ratio of the effective volume of said plunger (i.e., the space between the screw and the cylinder) to the effective volume of said accumulator (i.e., the maximum volume of the accumulator that can contain the molten thermoplastic resin when the plunger is in the rear position is in the range between 1:4 to 1:10 and a method for using said injection molding machine comprising extruding a molten thermoplastic resin material in said accumulator from said plunger, and injecting said molten thermoplastic resin material into said injection mold by pushing forward said plunger in said accumulator at an injection pressure in the range between 50 to 750 kg/cm$^2$.

For smooth injection molding, it is preferable to fix the inside diameter of the nozzle of said accumulator and the inside diameter of the sprue of said injection mold in the range between 1 to 100 mm respectively and further fix the injection pressure in the range between 50 to 750 kg/cm$^2$.

BRIEF DESCRIPTION OF THE DRAWINGS

FIG. 1 is a side sectional view of an injection molding machine when charge of a molten thermoplastic resin material into an accumulator is started.

FIG. 2 is a side sectional view of said injection molding machine when charge of a molten thermoplastic resin material into an accumulator has completed.

FIG. 3 is a side sectional view of said injection molding machine when a molten thermoplastic resin material is injected into an injection mold.

DETAILED DESCRIPTION OF THE INVENTION

Figure 1:
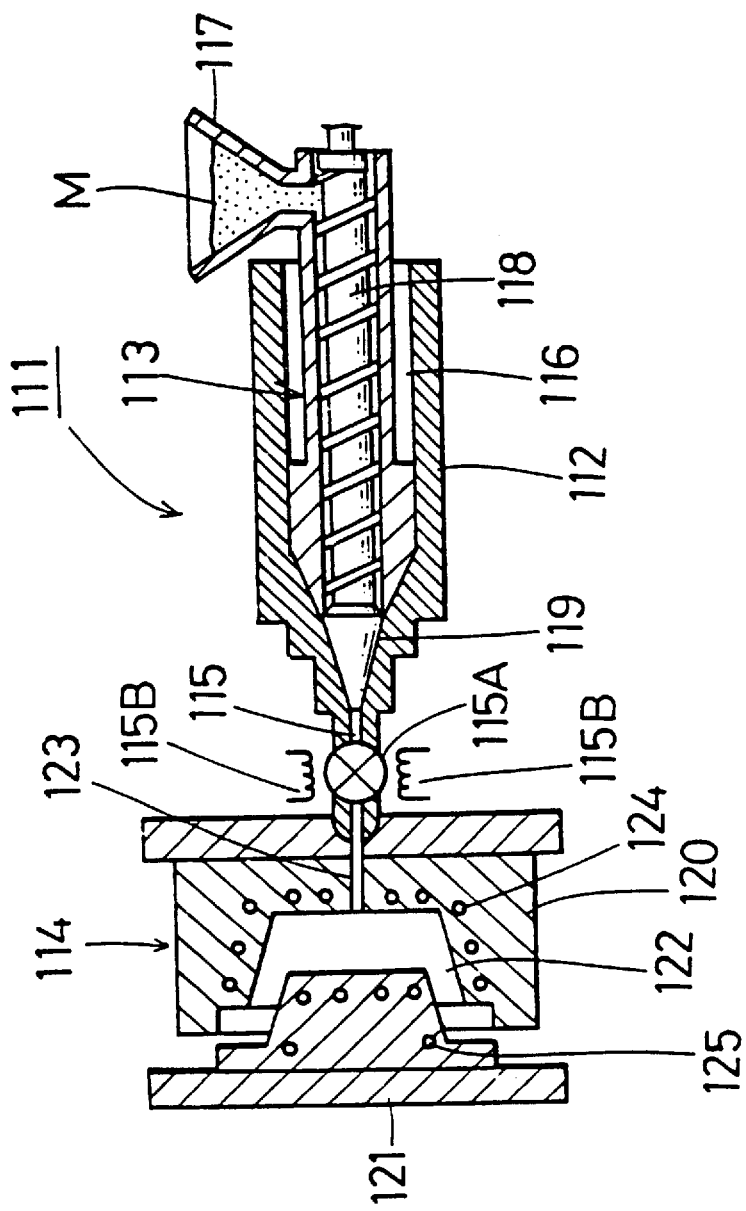
FIG. 1 to FIG. 3 relate to an embodiment of the present invention.
Figure 2:
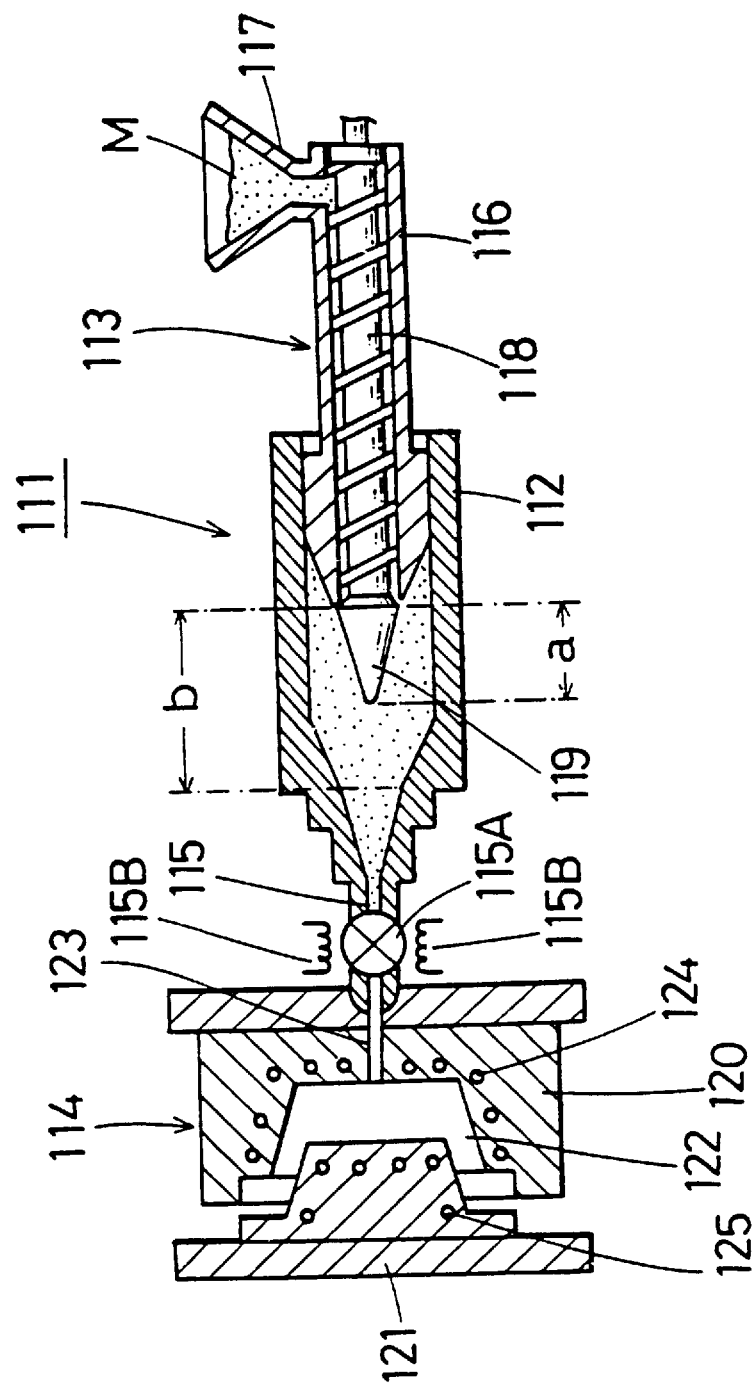
Figure 3:
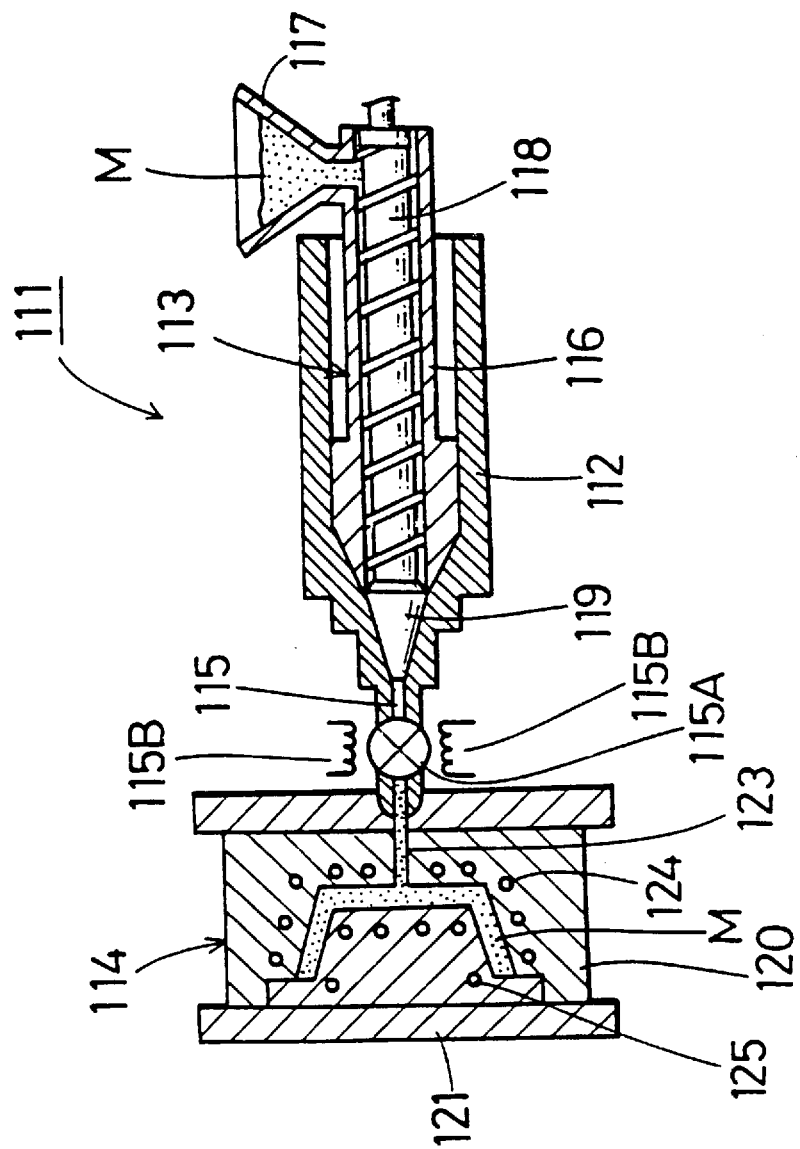

FIG. 1 to FIG. 3 relate to an embodiment of the present invention. Referring to figures, an injection molding machine (111) in this embodiment consists of an accumulator (112) in which a plunger (113) is provided and an injection mold (114) which connects with said accumulator (112). The inside of the front part of said accumulator (112) tapers off and a nozzle (115) provided with a stop valve (115A) having a heating means (115B) such as an electric heater, a steam heater, and the like is arranged at the front end of said accumulator (112) and said plunger (113) consists of a cylinder (116) provided with a hopper (117) at the rear part of said cylinder (116) and a screw (118 rotatably arranged in said cylinder (116). The tip (119) of said screw (118) protrudes from the front end of said cylinder (116) and the maximum diameter of said tip (119) is larger than the diameter of said screw (118) and further said tip (119) of said screw (118) has a shape corresponding to the inside shape of the front part of said accumulator (112). Said plunger (113) can be slided toward the front and the rear by a driving means along the axis of said cylinder (116) and the length a of the tapering part of said tip (119) of said screw (118) is fixed in the range between 30 to 120% of the sliding distance b of said plunger (113) as shown in FIG. 2. When said screw (118) is rotated to extrude a molten thermoplastic resin material into said accumulator (112), the tip (119) of said screw stirs uniformly said molten thermoplastic resin material.

In said accumulator (112), the ratio of the effective volume of said plunger (113) to the effective volume of said accumulator (112) is fixed in the range between 1:4 to 1:10 and the inside diameter of said nozzle (115) of said accumulator (112) is fixed in the range between 10 to 100 mm.

When the ratio of the effective volume of said plunger to the effective volume of said accumulator is less than 1:4, the object of the present invention to injection-mold a large size product by a small size plunger (extruder) cannot be attained and when the ratio of the effective volume of said plunger to the effective volume of said accumulator is beyond 1:10, the stay time of said molten thermoplastic resin material will become long and the effectiveness of stirring of the tip of said screw of said plunger will become worse and the uniform fluidity of said thermoplastic resin material cannot be guaranteed.

Said injection mold (114) consists of a fixed die plate (120) and a movable die plate (121) and a sprue (123) connecting with a cavity (122) is arranged in said fixed die plate (120) and said nozzle (115) of said accumulator (112) connects with said sprue (123). Further hot water pipes (124, 125) are respectively arranged in said fixed die plate (120) and said movable die plate (121).

The inside diameter of said sprue (123) of said injection mold is fixed so as to be equal to the inside diameter of said nozzle (115) of said accumulator (112) namely in the range between 10 to 100 mm.

When the inside diameter of said nozzle (115) and said sprue (123) are less than 10 mm, a high injection pressure will be necessary to inject smoothly said molten thermoplastic resin material into said injection mold and when the inside diameters of said nozzle (115) and said sprue (123) are beyond 100 mm, the injection pressure will become too low and said molten thermoplastic resin material cannot be injected uniformly into the cavity (122) of said injection mold (114).

A thermoplastic resin used in the present invention is such as a polyolefin resin such as a polyethylene resin, a polypropylene resin, an ethylene-propylene copolymer resin, an ethylene-vinylacetate copolymer resin and the like, a polyvinylchloroxide resin, a polys tyrene resin, a polymethacrylate resin, a styrene-butadiene copolymer resin, an acrylonitrile butadiene-styrene copolymer resin, polyamide resin, a polyester resin, a polycarbonate resin and the like. A polyolefin resin having a melt flow index (MFI) in the range between 30 to 300 and/or a polyvinylchloride resin having viscosity average molecular weight in the range between 18000 to 45000 are preferably used in the present invention.

To improve the rigidity and the heat resistance of the product, it is preferable to add inorganic filler in said thermoplastic resin. Said inorganic filler is such as cement filler, calcium carbonate, clay, mica, kaolin, fly ash, blast furnace slag, talc, glass fiber, carbon fiber, ceramic fiber, metal fiber and the like. Usually 50 to 200 parts by weight of said in organic filler is added to 100 parts by weight of said thermoplastic resin. In the case where a cement filler is added in said thermoplastic, a thermoplastic re sin product which can be used as a substitute of concrete product is obtained.

When said thermoplastic resin material is injection molded, said thermoplastic resin material M is charged into said plunger (113) through said hopper (117) as shown in FIG. 1 and said thermoplastic resin material M is melted by heating and mixed by said rotating screw (118). The resulting molten thermoplastic resin material M is extruded into said accumulator (112) sliding said plunger (113) toward the rear side as shown in FIG. 2. During said molten thermoplastic material M stays in said accumulator (112) said molten thermoplastic material M is uniformly mixed by the tip (119) of said rotating screw (118) protruding from the front end of said cylinder (116) so that the uniform fluidity of said thermoplastic resin material M in said accumulator (112) is guaranteed. During charging said molten thermoplastic resin material M into said accumulator (112), the nozzle (115) of said accumulator (112) is shut by said stop valve (115A) to avoid the leak of said molten thermoplastic resin material M from said nozzle (115) and said stop valve (115A) is heated by said heating means (115B) at a temperature higher than the melting point of said thermoplastic resin to avoid condensation of said molten thermoplastic resin material M to said stop valve (115A). When said thermoplastic resin material M has been completely charged into said accumulator (112), as shown in FIG. 3, said movable die plate (121) is in close contact with said fixed die plate (120) in said injection mold (114) heating said injection mold (114) by said hot water pipes (124, 125) and then the stop valve (115A) of said nozzle (115) is opened and the rotation of said screw (118) of said plunger (113) is stopped to allow said plunger (113) move toward the forward side so that said molten thermoplastic resin material M is injected into the cavity (122) of said injection mold (114) from the nozzle (115) of said plunger (113) through the sprue (123). When said thermoplastic resin material M is injected into said injection mold (114) as above described, the injection pressure is fixed in the range between 50 to 750 kg/cm$^2$. When the injection pressure is less than 50 kg/cm$^2$, the injection time becomes too long so that the stay time of said molten thermoplastic resin material M in said accumulator (112) becomes too long resulting in the deviation of the temperature, namely the deviation of the fluidity of said molten thermoplastic resin material M and when the injection pressure is beyond 750 kg/cm$^2$, said injection mold (114) should have a high mechanical strength to resist said high injection pressure resulting in expensiveness of said injection mold.

Since the inside diameters of said nozzle (115) of said accumulator (112) and said sprue (123) of said injection mold (114) are fixed in the range between 10 to 100 mm, said molten thermoplastic resin material M is smoothly injected into said mold (114) from said accumulator (112) at a injection pressure in the range between 50 to 750 kg/cm².

EXAMPLE 1

Said injection molding machine (111) shown in FIG. 1 to FIG. 3 was used in this example. The inner diameter of said accumulator (112) was 250 mm and the effective volume of said accumulator (112) was 18 liter. Said effective volume of said accumulator (112) was fixed five times of the effective volume of said plunger (113) wherein said effective volume of said plunger (113) was defined as the volume of said molten thermoplastic resin material M filled in the space between said cylinder (117) and said screw (118) of said plunger (113) and the diameter of said screw (118) was 150 mm and said effective volume of said plunger (113) was 3.6 liter. The clamping pressure of said injection mold (114) was fixed at 500 tons and the volume of said cavity (122) of said injection mold (114) was 10 liter, the average space thickness of said cavity (122) was 10 mm and the inner diameter of said sprue (123) was 35 mm.

A sample was molded by using said injection molding machine (111) and a thermoplastic resin material M consisting of a mixture is shown as follows:

| Polypropylene (MFI 100) | 100 parts by weight |
| Talc | 100 parts by weight |
| Stabilizer | 0.5 parts by weight |
| Pigment | 2 parts by weight |

Said thermoplastic resin material M was heated at 210° C. to melt and mix in said plunger (113) of said injection molding machine (111) and said injection mold (114) was heated at 50° C. by said hot-water pipes (124, 125) and said stop valve (115A) was heated at 200° C. by said heating means (115B) before injection of said molten thermoplastic resin material M. Said molten thermoplastic resin material M was charged into said accumulator (112) from said plunger (113) for 2 minutes and then said molten thermoplastic resin material M in said accumulator (112) was injected into said injection mold (114) for 0.3 minutes at 180 kg/cm². A uniform product having a smooth surface and an excellent appearance was injection-molded by said injection molding process.

EXAMPLE 2

In this example the same injection molding machine (111) as EXAMPLE 1 was used and a thermoplastic resin material M consisting of a mixture is shown as follows:

| Low density polyethylene (MFI 100) | 100 parts by weight |
| Fly ash | 50 parts by weight |
| Stabilizer | 0.5 parts by weight |
| Pigment | 2 parts by weight |

Said thermoplastic resin material M was heated at 140° C. to melt and mix in said plunger (113) of said injection molding machine (111) and said injection mold (114) was heated at 30° C. by said hot water pipes (124, 125) and said stop valve (115A) was heated at 130° C. by said heating means (115B) before injection of said molten thermoplastic resin material M. In this example, the charging time of said molten thermoplastic resin material M into said accumulator (112) was 2.0 minutes, the injection time of said molten thermoplastic resin material M into said injection mold (114) was 0.2 minutes and the injection pressure was 150 kg/cm². A uniform product having a smooth surface and an excellent appearance was injection-molded by said injection mold process.

EXAMPLE 3

In this example the same injection molding machine (111) as EXAMPLE 1 was used and a thermoplastic resin material M consisting of a mixture is shown as follows:

| Polyamide (Nylon 6, MFI 80) | 100 parts by weight |
| Talc | 100 parts by weight |
| Stabilizer | 0.5 parts by weight |
| Pigment | 2 parts by weight |

Said thermoplastic resin material M was heated at 240° C. to melt and mix in said plunger (113) of said injection molding machine (111) and said injection mold (114) was heated at 60° C. by said hot water pipes (124, 125) and said stop valve (115A) is heated at 220° C. by said heating means (115B) before injection of said molten thermoplastic resin material M. In this example, a space (5 mm) between said fixed mold plate (120) and said movable mold plate (121) of said injection mold (114) was formed in the beginning of the injection mold process and 5 seconds after the start of said injection molding process, closing of said injection mold (114) started and the closing time was 5 seconds. The charging time of said molten thermoplastic resin material M into said accumulator (112) is 2.0 minutes, the injection time of said molten thermoplastic resin material into said injection mold (114) was 0.4 minutes and the injection pressure was 170 kg/cm². A uniform product having a smooth. surface and an excellent appearance was injection-molded by said injection mold process.

EXAMPLE 4

In this example the same injection molding machine (111) as

EXAMPLE 1 was used and a thermoplastic resin material M consisting of a mixture is shown as follows:

| Polyvinylchloride (Viscosity average molecular weight 28000) | 100 parts by weight |
| Calcium carbonate | 50 parts by weight |
| Stabilizer | 0.5 parts by weight |
| Pigment | 2 parts by weight |

Said thermoplastic resin material M was heated at 190° C. to melt and mix in said plunger (113) of said injection molding machine (111) and said injection mold (114) is heated at 50° C. by said hot water pipes (124, 125) and said stop valve (115A) was kept in open condition and said stop valve (115A) was not heated. As EXAMPLE 3, a space (5 mm) between said fixed mold plate (120) and said movable mold plate (121) of said injection mold (114) was formed in the beginning of the injection mold process and 5 seconds after the start of said injection molding process, closing of said injection mold (114) started and the closing time was 5 seconds. The charging time of said molten thermoplastic resin material M into said accumulator (112) was 2.0 minutes, the injection time of said molten thermoplastic resin material into said injection mold (114) was 0.4 minutes and the injection pressure was 300 kg/cm². A uniform product having a smooth surface and an excellent appearance was injection-molded by said injection mold process.

EXAMPLE 5

In this example the same injection molding machine (111) as EXAMPLE 1 was used and a thermoplastic resin material M consisting of a mixture is shown as follows:

| Polypropylene (MFI 100) | 100 parts by weight |
| Portland cement | 150 parts by weight |
| Stabilizer | 0.5 parts by weight |

Said thermoplastic resin material M was heated at 210° C. to melt and mix in said plunger (113) of said injection molding machine (111) and said injection mold (114) was heated at 50° C. by said hot water pipes (124, 125) and said stop valve (115A) was heated at 200° C. by said heating means (115B) before injection of said molten thermoplastic resin material M. In this example, a space (5 mm) between said fixed mold plate (120) and said movable mold plate (121) of said injection mold (114) was formed in the beginning of the injection mold process and 5 seconds after the start of said injection molding process, closing of said injection mold (114) started and the closing time was 5 seconds. The charging time of said molten thermoplastic resin material M into said accumulator (112) was 2.0 minutes, the injection time of said molten thermoplastic resin material into said injection mold (114) was 0.5 minutes and the injection pressure was 190 kg/cm$^2$. A uniform product having a smooth surface and an excellent appearance was injection-molded by said injection mold process and is used as a substitute of concrete product.

COMPARISON 1

The same injection molding process as EXAMPLE 1 was applied but in this comparison, polypropylene having a MFI 15 was used and said stop valve (115A) was not heated and further said injection mold (114) was closed from the beginning of the injection molding process.

In this comparison, an injection time longer than 1.0 minute and an injection pressure higher than 1000 kg/cm$^2$ were necessary. When the injection pressure was lower than 500 kg/cm$^2$, said molten thermoplastic resin material M did not fill said cavity enough and the resulting product had an uneven surface and an inferior appearance.

COMPARISON 2

Figure 4:
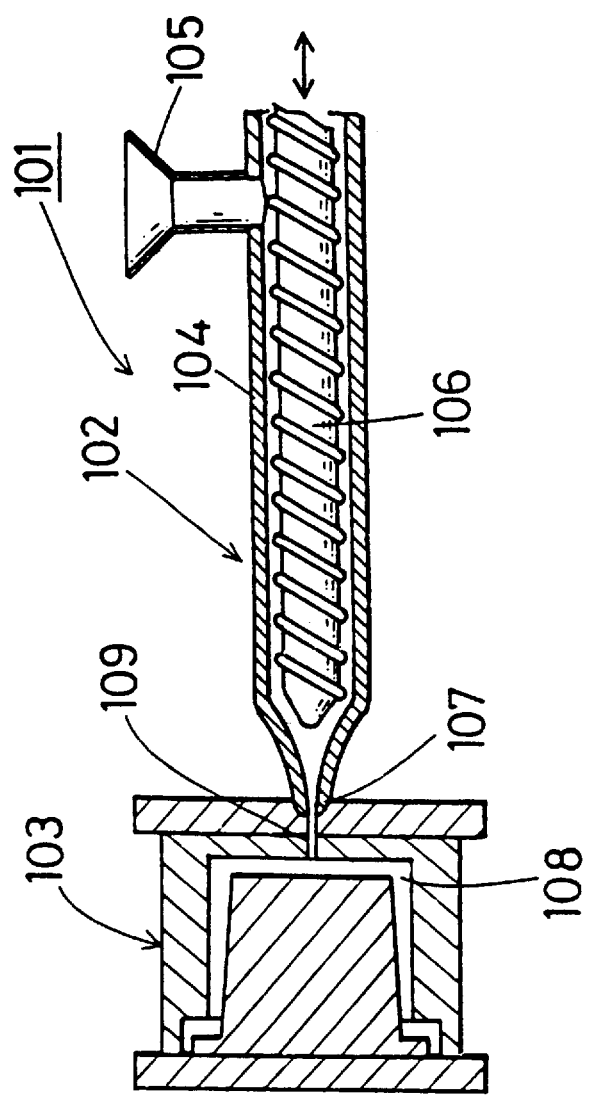
FIG. 4 is a side sectional view of a traditional injection molding machine.

In this comparison, a traditional injection molding machine (101) shown in FIG. 4 was used. Referring to FIG. 4, said injection molding machine (101) consists of an extruder (102) and an injection mold (103) wherein said extruder (102) consists of a cylinder (104) provided with a hopper (105) at the rear part of said cylinder (104) and a screw (106) rotatably arranged in said cylinder (104) and a nozzle (107) of said extruder (102) connects a cavity (108) of said injection mold (103) through a sprue (109). Using same thermoplastic resin materials as used in EXAMPLES 1 to 5, products were molded by said traditional injection machine (101).

In these cases, said traditional injection machine (101) must have a clamping mechanism with 300 tons of the clamping pressure considering the injection volume of 1500 tons of the clamping pressure considering the plasticizing ability so that said injection mold (103) must have a high mechanical strength and said injection molding machine (101) and molding cost will be very expensive.

COMPARISON 3

Said traditional injection molding machine (101) as shown in FIG. 4 was used in this comparison and said injection mold (103) had the same structure as used in EXAMPLE 1 wherein the diameter of said sprue (109) was 5 mm. Using same thermoplastic resin material as used in EXAMPLE 4, a product was injection-molded by using said traditional injection molding machine (101).

In this case, said injection mold (103) was closed from the beginning of the injection molding process. As a result, an over load was effected on the driving source (a motor) of said screw (106) of said extruder (102) so that the rotation speed of said screw (106) must be reduced resulting in a long injection time of about 10 minutes. Further, although the injection pressure was fixed at 1450 kg/cm$^2$, the maximum pressure, said molten thermoplastic resin material M did not fill said cavity (108) enough and the product could not be molded.

We claim:

1. An injection molding machine for thermoplastic resin comprising an accumulator in which a plunger is slidably provided and an injection mold, the sprue of said injection mold connecting with the nozzle of said accumulator, wherein said plunger comprises a cylinder having an extended diameter part, the diameter of said extended diameter part being, substantially the same as the inside diameter of said accumulator at the front end of said cylinder and a screw rotatably arranged in said cylinder, and a tip connected to said screw and protruding from the front end of said cylinder, the maximum diameter of said tip exceeding the diameter of said screw, and the melted thermoplastic resin being extruded through a slit between said tip and said cylinder, and the ratio of the effective volume of said plunger to the effective volume of said accumulator being in the range of 1:4 to 1:10.

2. An injection molding machine in accordance with claim 1 wherein the inside diameter of the nozzle of said accumulator and the inside diameter of the sprue of said injection mold are respectively fixed in the range of 10 to 100 mm.

3. An injection molding machine in accordance with claim 1 wherein a stop valve having a heating means is arranged in the nozzle of said accumulator.

* * * * *